April 15, 1930. F. W. GAY 1,754,314
COOLING SYSTEM FOR UNDERGROUND ELECTRIC TRANSMISSION LINES
Filed April 28, 1928 2 Sheets-Sheet 1

INVENTOR.
FRAZER W. GAY
BY
ATTORNEY.

April 15, 1930.  F. W. GAY  1,754,314
COOLING SYSTEM FOR UNDERGROUND ELECTRIC TRANSMISSION LINES
Filed April 28, 1928   2 Sheets-Sheet 2

INVENTOR.
FRAZER W. GAY
BY
George D. Richards
ATTORNEY.

Patented Apr. 15, 1930

1,754,314

UNITED STATES PATENT OFFICE

FRAZER W. GAY, OF NEWARK, NEW JERSEY

COOLING SYSTEM FOR UNDERGROUND ELECTRIC TRANSMISSION LINES

Application filed April 28, 1928. Serial No. 273,637.

This invention relates to cooling systems and particularly to cooling systems for underground electrical cable installations.

Owing to the development of the electric industry the amount of electric force transmitted is constantly increasing. This, together with the constantly increasing density of population and the high costs of private rights of way, is increasingly causing the placing of high power lines underground. These underground high power lines are run in the form of cables through ducts in conduit lines. Heretofore, owing to the relatively large amount of heat given off by these cables while operating under peak load conditions, it has been customary to utilize only a portion of the capacity of a multi-duct conduit line and only a portion of the total capacity of such cables as are installed in such line.

One feature of this invention is to provide a cooling system, which when applied to a conduit line will permit the usable capacity of the ducts and cables to be greatly increased.

Another feature of the invention is to provide a cooling system of the above character that maintains the temperature of the conducting cables at a safe value regardless of load conditions.

A third feature of the invention lies in the provision of a cooling system of the above character that effectively prevents one or more overheated or damaged cables from overheating an adjacent cable or cables.

A fourth feature of the invention is to provide a cooling system of the above character that may also be utilized for street lighting purposes if desired.

Still another feature of the invention lies in the provision of a cooling system of the above character that is of simple construction and reliable in operation.

Other features and advantages will become apparent from the specification, taken in connection with the accompanying drawings wherein the invention is embodied in concrete form.

In the drawings:—

Figure 1:
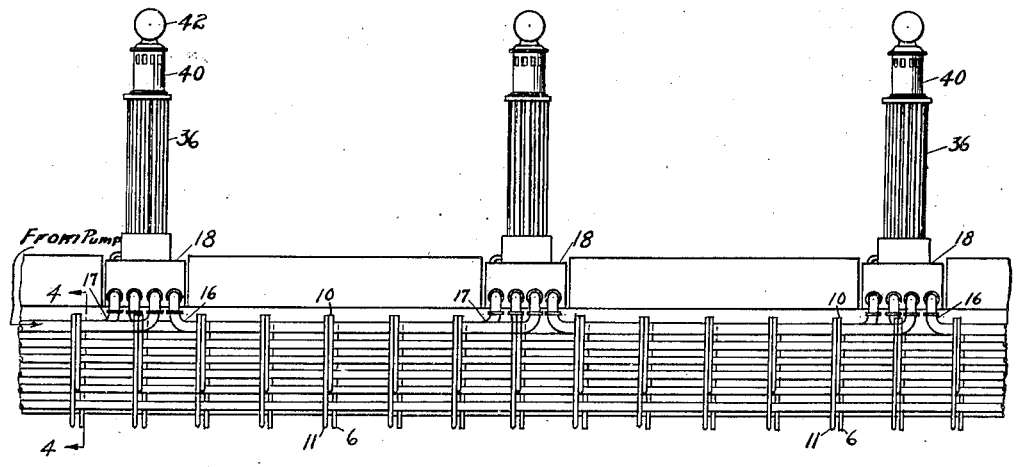
Figure 1 is a schematic view, with parts broken away, of the cooling system of this invention as applied to a typical underground cable installation.
Figure 4:
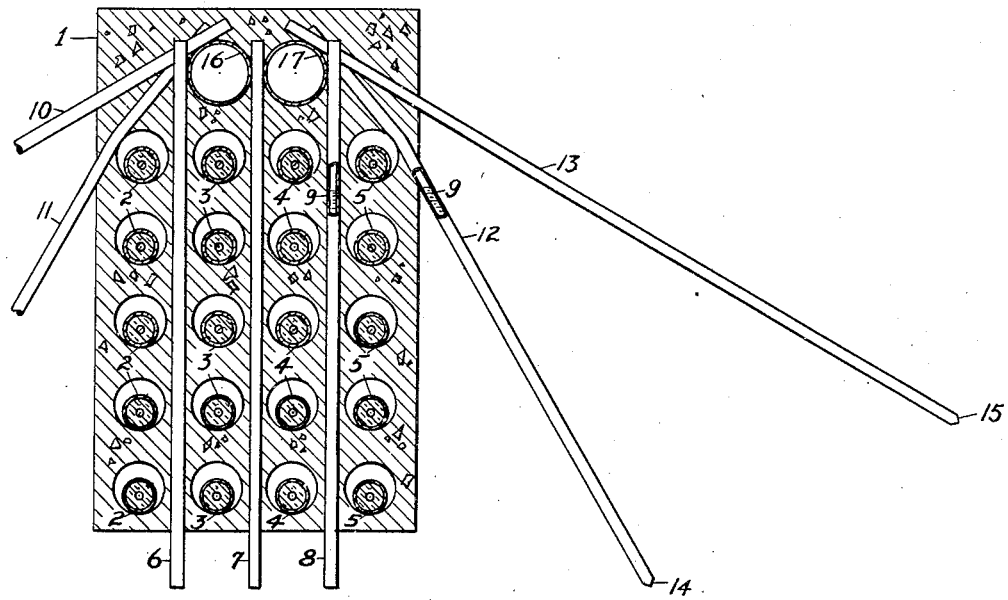
Figure 4 is an enlarged cross-section with parts broken away taken along the line 4—4 of Figure 1.

As illustrated in Figures 1 and 4, the underground conduit system comprises a plurality of spaced parallel electrical conducting cables. These cables extend along parallel ducts in a suitable duct line or multi-duct conduit 1 of concrete or other material. These cables are usually arranged in parallel rows. In the drawings five cables are illustrated as comprising each vertical row of cables. For convenience of description, the cables in the first row shown in Figure 4 are designated by the reference numeral 2 and those in the second, third and fourth rows by the reference numerals 3, 4 and 5, respectively.

According to the preferred arrangement, a plurality of metallic tubes 6, 7, 8, 10, 11, 12 and 13 are positioned at intervals along the cable installation and extend down adjacent to the cables and the conduit carrying the same. The tubes 6 extend vertically between rows of cables 2 and 3, tubes 7 between cables 3 and 4 and tubes 8 between cables 4 and 5. The tubes 10, 11, 12 and 13 are inclined at varying angles to the vertical and extend into the ground surrounding the cable installation. The tubes 10, 11, 12 and 13 may have their lower ends tapered to a point as at 14 and 15 so as to enable these tubes to be readily driven into the ground from above. Air is excluded from these tubes and they are closed at their ends and are hermetically sealed. They are partially filled with a volatile liquid 9 such as methyl alcohol and are adapted to conduct the heat given off by the cables 2, 3, 4 and 5 upwardly and away from these cables.

The upper portions of tubes 6, 7, 8, 10, 11, 12 and 13 are positioned adjacent a pair of conduits 16 and 17 that are placed above and extend parallel to the conducting cables 2, 3, 4 and 5. The upper portions of these tubes and the conduits 16 and 17 may be surrounded by a material such as lead having a thermal conductivity that is greater than that of the material of the duct line itself.

The conduits or pipes 16 and 17 carry a circulating cooling fluid for the purpose of cooling the upper ends of the tubes 6, 7, 8, 10, 11, 12 and 13. This circulating fluid may be any suitable fluid having a high specific heat such as water or oil. Oil is preferable to water in systems subjected to low temperatures owing to its lower freezing point. The pipes 16 and 17 at regular intervals are connected to coolers 18. Each of the coolers 18 (see also Figures 2 and 3) comprise a casing 20 having end plates 21 and 22. A header 23 is secured to end plate 21. The header 23 has four chambers 24, 25, 26 and 27. The inlet and outlet ends of pipe 17 connect with chambers 24 and 25, respectively, whereas the inlet and outlet ends of pipe 16 connect with chambers 26 and 27 respectively. A header 28 is secured to end plate 22. The header 28 has two chambers 30 and 31. A plurality of parallel tubes 32 extend between the end plates 21 and 22. Each of these tubes 32 connects one of the chambers 24, 25, 26 or 27 to one of the chambers 30 and 31. A volatile liquid 33 such as methyl alcohol is contained within the casing 20 and has its surface level at a point above the uppermost row of tubes 32.

Figure 2:
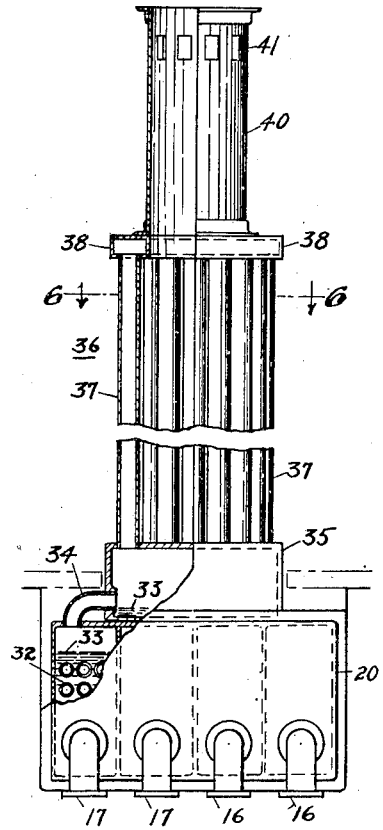
Figure 2 is an enlarged view, with parts broken away, of a portion of the structure illustrated in Figure 1.
Figure 3:
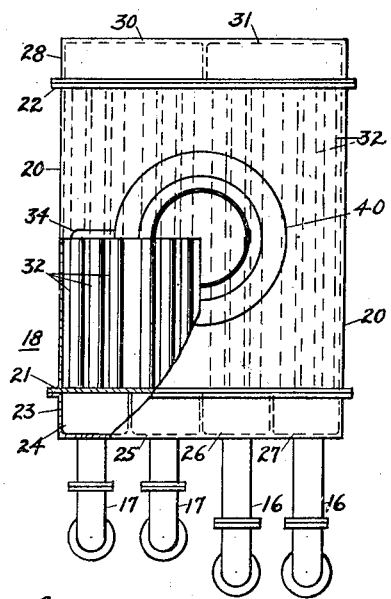
Figure 3 is a plan view of the structure shown in Figure 2.
Figure 6:
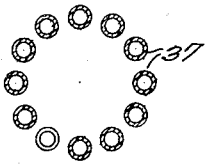
Fig. 6 is a sectional view taken along line 6—6 of Fig. 2 and illustrates the annular arrangement of the radiator tubes.

Vapor from the liquid 33 is adapted to pass through a pipe 34 to a reservoir 35 of a radiator 36. The radiator 36 comprises a plurality of annularly arranged vertical cooling tubes 37. The tubes 37 have their lower ends extending through the top of the reservoir 35 and their upper ends extending into the underside of an annular header 38. A chimney 40 is mounted upon the top of the header 38. The chimney 40 has windows 41 near its upper end, and may be adapted to carry a lighting fixture 42. The lighting fixture may be omitted if desired as illustrated in Figure 2 in which event the windows 41 may be omitted.

In operation, the circulating fluid within the conduits or pipes 16 and 17 and coolers 18 is caused to flow by means of a suitable pump, not shown. Assuming the direction of flow to be from left to right in Figure 1, the circulating fluid within pipe 17 passes initially into chamber 24 of the first cooler 18. From chamber 24 this circulating fluid passes through certain of the tubes 32 into chamber 30. From chamber 30 the circulating fluid passes through others of the tubes 32 into the chamber 25 and from thence back into the pipe 17. Likewise, the circulating fluid within the pipes 16 passes first into chamber 26 of the first cooler 18. From chamber 26 this circulating fluid passes through some of the tubes 32 and into the chamber 31. From the chamber 31 the circulating fluid passes through still others of the tubes 32 into the chamber 27 and from thence back into the pipe 16. It will be obvious from the above description and the drawings that the circulating fluid passes through each of the successive coolers 18 in its flow from and to the circulating pump. If desired, the circulating fluid may be caused to flow in opposite directions in the pipes 16 and 17, or in such manner as to permit repeated circulation thereof.

Should any of the cables 2, 3, 4 and 5 tend to become unduly heated owing to the overloading, short circuits, or from any other causes, the heat will be transferred by conduction through the tubes 6, 7, 8, 10, 11, 12 and 13 that are adjacent such cables so that the liquid therein will become heated. This liquid will then vaporize, thus carrying the heat to the upper ends of the hermetically sealed tubes and away from the cables, thereby relieving the heated condition. At the upper ends of the tubes the vapor condenses, giving up its heat to the walls of the tubes from which it is conducted to the pipes or conduits 16 and 17 containing the circulating fluid. The circulating fluid, since it is continuously moving, carries the heat with it to the coolers 18. Within each of the coolers 18 the circulating fluid is chilled on passing through the tubes 32 since these tubes are surrounded by the volatile liquid 33 which absorbs the heat of the circulating fluid. The volatile liquid 33 having a low boiling point vaporizes and ascends through the pipe 34 into the reservoir 35 of the radiator 36. From the reservoir 35 this vapor passes upwardly into the cooling tubes 37 where it condenses and later flows back into the reservoir 35 and from there it passes back through the pipe 34 into the cooler 18.

The condensing of the volatile liquid 33 within the cooling tubes 37 tends to heat these tubes, thereby effecting the heating of the surrounding air. The cylindrical column of air confined within the annular row of cooling tubes on becoming heated expands, and decreasing in density, is caused by the colder and denser air surrounding the radiator 36 to pass up through the chimney 40 and out of the windows 41. The action of the chimney 40 also increases the draft and causes a relatively large volume of cool air to pass around and between the cooling tubes 37 and into the interior of the radiator 36, thereby maintaining the cooling tubes and the volatile liquid 33 at a low temperature.

Thus the cables are maintained in a cool condition by the action of the hermetically sealed tubes in passing the heat of these cables on to the circulating medium which in turn passes this heat on to the volatile liquid within the coolers 18. These coolers then pass the heat to the radiators 36 where it is dispersed into the ambient air. The cables being maintained at a low temperature are consequently enabled to carry a much larger load than they would otherwise be able to transmit. Also should any of the cables tend to become overheated owing to an overload, short circuit, or other cause, the excessive heat from this cable will be transmitted to the circulating fluid within the pipes 16 and 17 as before, without any harm resulting to the surrounding cables.

The use of the cooling system of this invention permits all of the ducts within the duct line 1 to be used simultaneously regardless of the number of rows of ducts. This is because this cooling system removes the heat from between each row of ducts. Likewise the intermediate rows of cables 3 and 4 can carry their full load current inasmuch as they do not depend on the heat conductivity of the adjoining ducts.

The hermetically sealed tubes not only cool the conduit line but also the surrounding ground. Tubes 10, 11, 12 and 13 extend directly into the ground at the sides of the conduit line for this purpose. These hermetically sealed tubes may be omitted if desired in some installations as, for example, when the conduits have only a few ducts and especially where the tubes 16 and 17 are surrounded by a material such as lead as previously mentioned having a thermal conductivity that is greater than that of the material of the duct line itself.

By using the cooling system of this invention, a relatively heavy load may be carried for a short period even though considerable heat is generated during such periods. A large portion of the heat thus generated is dissipated during this period and the higher temperature of the conduit system produced during this period is quickly reduced to normal when the load is lightened.

Thus, during the early morning hours when the load is light, not only is the duct line thoroughly cooled but also the surrounding ground, thereby permitting a heavy day load to be carried. If desired, the pumps for moving the circulating fluid may be shut down for a few hours at a time as for repairs, since the duct line and the surrounding ground has been retained at a low temperature prior to such shut down.

Figure 5:
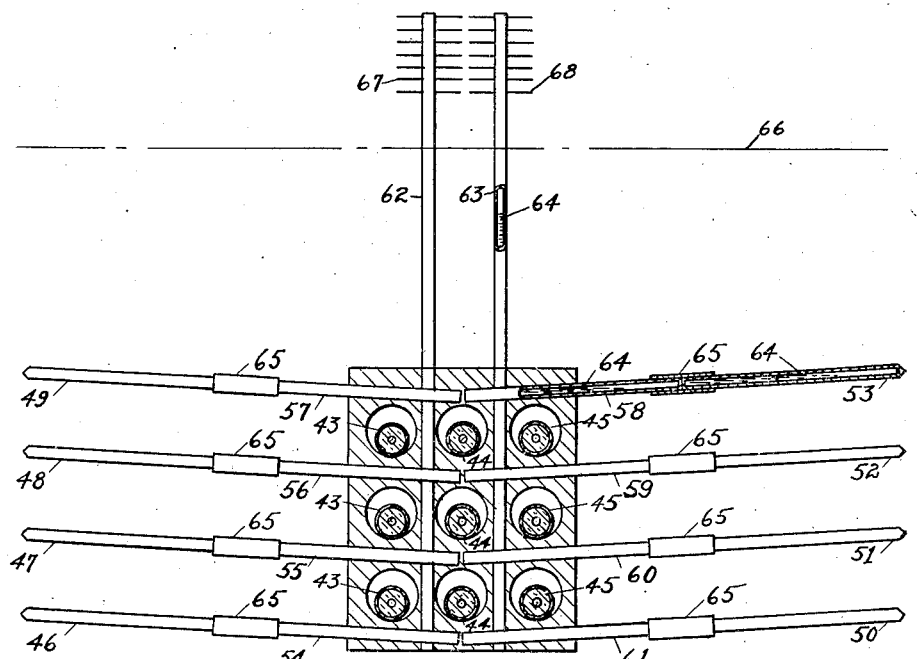
Figure 5 is a view similar to Figure 4, but illustrates a somewhat different arrangement of cooling tubes.

In the structure shown in Figure 5, the pipes carrying the circulating fluid together with the coolers and radiators are omitted. In this arrangement the vertical rows of cables 43, 44 and 45 are cooled entirely by the action of the hermetically sealed tubes 46 to 63. These tubes are similar in construction to tubes 6, 7, 8, 10, 11, 12 and 13 and are partially filled with volatile liquid 64. The tubes 46 to 61 are arranged in pairs which are axially aligned and are connected by sleeves 65. These pairs of axially aligned tubes extend outwardly and upwardly from between the successive horizontal rows of cables and serve to conduct the heat of the cables to the surrounding earth. The tubes 46 to 61 are arranged in longitudinally aligned pairs to facilitate their placing in the ground. The outer tubes 46 to 53 are first driven into the ground from the sides of the trench provided for the conduit line. These tubes are driven so as to incline upward slightly. The sleeves 65 are then slipped over the adjacent ends of the outer and inner tubes and the inner tubes 54 to 61 are then driven into the ground.

The tubes 62 and 63 are positioned vertically between the rows of cables 43, 44 and 45. These tubes extend upwardly close to the surface of the ground and whenever cables are carried over private rights of way these tubes extend above the ground level 66 and carry radiators 67 and 68. These radiators serve to transfer the heat of the tubes 62 and 63 to the surrounding air.

In operation, should any of the cables 43, 44 or 45 tend to become overheated, the volatile liquid 64 will vaporize, thereby conducting the heat to the upper portions of the tubes 54 to 63. At the upper portions of these tubes, this vapor condenses and trickles back to the liquid in the lower part of the tubes. The upper portions of tubes 54 to 61 pass the heat of vaporization of the volatile liquid partly to the surrounding earth and partly to the tubes 46 to 53. This heat passes either directly from the end of the inner tubes to the outer tubes or through the sleeves 65 to the outer tubes 46 to 53. The volatile liquid 64 within outer tubes 46 to 53 likewise conducts this heat to the upper portions of these tubes and from thence it is transferred to the surrounding ground. Tubes 62 and 63 not only transfer the heat of the conduit line to the earth above this line but also to the surrounding air through the action of the radiators 67 and 68.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. Means for cooling electrical conduits comprising, cooling tubes having their lower portions in the proximity of the conduits to be cooled and their upper portions extending away from the conduits for the purpose of conducting heat away from the latter, said tubes being hermetically sealed and containing a volatile liquid and fluid retaining means adjacent the upper portions of said tubes and adapted to retain a cooling fluid for effecting the cooling of the upper portions of said tubes.

2. A cooling system for conduit lines comprising, hermetically sealed tubes containing a volatile liquid positioned at intervals along the conduit line, said tubes having their inward portions embedded in the conduit structure and their outlying portions embedded in the earth surrounding the conduit structure.

3. Means for cooling electrical conduits comprising, a plurality of cooling tubes positioned at intervals along the line of the conduits, and conveying means for a circulating fluid having a path extending in the direction of the conduits, said cooling tubes acting to conduct heat away from the conduits and to transfer heat to the circulating medium constant within said conveying means.

4. Means for cooling electrical conduits comprising, a plurality of cooling tubes positioned at intervals along the line of the conduits for conducting heat away from the conduits, a conveying pipe for a circulating fluid having a path that is parallel to the conduits, and coolers inserted at intervals along the path of said pipe for the circulating fluid, said circulating fluid acting to absorb heat from said cooling tubes and to deliver heat to said coolers.

5. A cooling system for underground electrical conduits comprising, a pipe for conveying a circulating fluid flowing in a path extending in the direction of the conduits, means comprising a confined volatile liquid for conducting heat given off by the conduits to said circulating fluid, and means comprising a confined volatile liquid for conducting heat from said circulating fluid.

6. Means for cooling electrical conduits comprising, piping for retaining a fluid contiguous to the electrical conduits for the purpose of absorbing heat from the conduits, coolers positioned at intervals along the line of said electrical conduits and connected to said piping for the purpose of cooling the fluid within said piping, said coolers containing a volatile liquid that is caused to be vaporized by the heat absorbed by the coolers, and radiating means for condensing the volatile liquid vaporized in the coolers, said radiating means acting to transfer the heat of vaporization of the volatile liquid to the atmosphere.

7. Means for cooling electrical conduits comprising, piping for retaining a fluid contiguous to the electrical conduits for the purpose of absorbing heat from the conduits, coolers positioned at intervals along the line of said electrical conduits and connected to said piping for the purpose of cooling the fluid within said piping, said coolers containing a volatile liquid that is caused to be vaporized by the heat absorbed by the coolers, pumping means for causing the fluid in said piping to circulate through said piping and said coolers, and radiators for condensing the volatile liquid vaporized in the coolers, each of said radiators comprising a plurality of tubes containing the vapor of the volatile liquid and a chimney for increasing the flow of air around said tubes.

8. A cooling system for electrical conduit lines comprising, hermetically sealed tubes containing a volatile liquid, said tubes having their lower portions positioned beside the conductors of a conduit line at intervals along the run of the conduit line, the volatile liquid within said tubes being vaporized by the heat of the conductors whereupon the heat of the conductors is carried by the vapor produced to the upper portions of said tubes and dispersed at a distance from the conductors, and conveying means for absorbing a larger portion of such dispersed heat and for conveying the same to a still greater distance from the conductors for further dispersion.

In testimony, that I claim the invention set forth above I have hereunto set my hand this 24th day of April, 1928.

FRAZER W. GAY.